United States Patent [19]

Pollacco

[11] Patent Number: 5,305,910
[45] Date of Patent: Apr. 26, 1994

[54] CONTAINER FOR ENGINE OIL

[75] Inventor: Paul J. Pollacco, Alexandria, Va.

[73] Assignee: Amersave Products Corporation, Alexandria, Va.

[21] Appl. No.: 977,759

[22] Filed: Nov. 17, 1992

[51] Int. Cl.⁵ .............................................. B65D 25/28
[52] U.S. Cl. .................... 220/771; 141/343; 215/100 A
[58] Field of Search .................... 215/1 C, 100 A; 141/338, 343; 220/771

[56] References Cited

U.S. PATENT DOCUMENTS

| 4,236,655 | 12/1980 | Humphries | 222/465 |
| 4,403,692 | 9/1983 | Pollacco | 206/223 |
| 4,524,866 | 6/1985 | Pollacco | 206/223 |
| 4,533,042 | 8/1985 | Pollacco | 206/223 |

FOREIGN PATENT DOCUMENTS 2549012 1/1985 France .................... 220/770

Primary Examiner—William I. Price
Attorney, Agent, or Firm—Cushman Darby & Cushman

[57] ABSTRACT

A jug for new oil is disclosed having a neck which opens upwards at one end of a flat platform. The jug is provided with a handle slot located below the neck, which tends to reduce rapid variations in pouring rate (i.e. 'glugging') as new oil is poured out. The platform aids in supporting the catch pan as used oil is drained from it through a drain opening, into the emptied jug which had contained the new oil. The catch pan is provided with a plug operated by a T-handle. Also disclosed are a funnel which can be nested in an inverted condition on the jug neck, and a catch pan with a boat-shape to permit over-the-lip pouring of used oil therefrom as an alternative to controlled draining of used oil therefrom through a bottom wall drain.

2 Claims, 3 Drawing Sheets

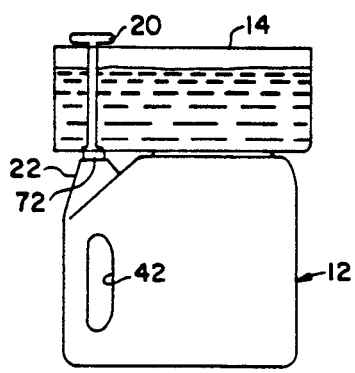
FIG. 6(a)
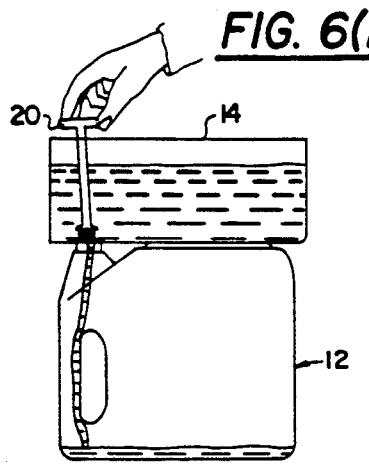
FIG. 6(b)
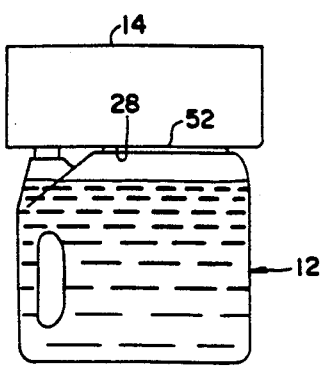
FIG. 6(c)
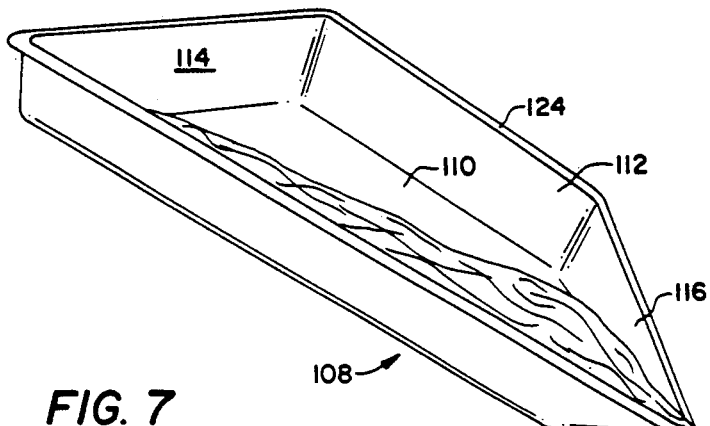
FIG. 8
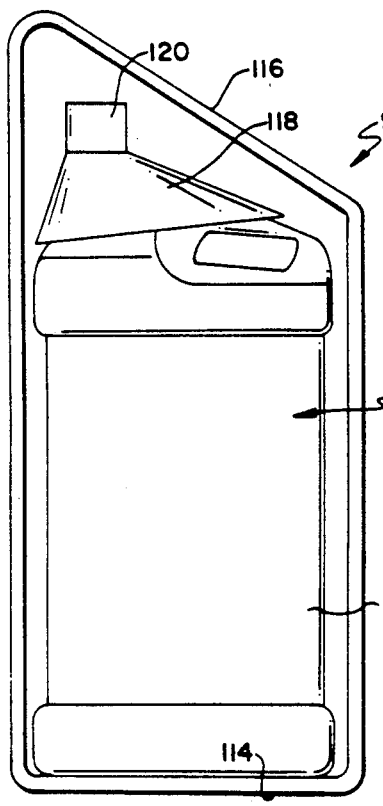
FIG. 7
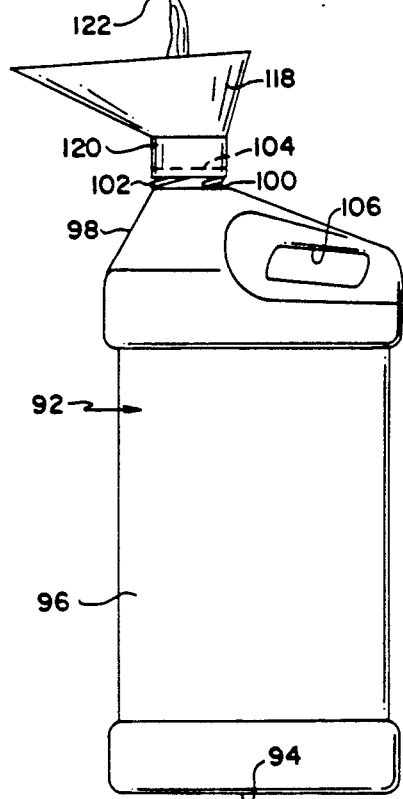

CONTAINER FOR ENGINE OIL

BACKGROUND OF THE INVENTION

The U.S. Patents of W. J. Pollacco U.S. Pat. Nos. 4,403,692, issued Sep. 13, 1983 and 4,533,042, issued Aug. 6, 1985 and of Paul J. Pollacco (the present inventor) 4,524,866, issued Jun. 25, 1985 disclose several devices which are designed to be used by do-it-yourselfers in changing their automotive engine oil in a convenient, yet socially-responsible manner.

In general, these prior patents disclose kits and parts for use in a procedure in which used oil is drained from the automotive engine crank case into an open catch pan (i.e. a drain pan) slid under the vehicle. After the crankcase outlet plug is closed, new oil is poured from a jug into the filler tube on the engine. Finally, the used oil caught in the catch pan is poured from the catch pan back into the previously emptied new oil jug.

The present invention is directed towards refinements, elaborations and improvements of those kits and parts.

SUMMARY OF THE INVENTION

A jug for new oil is disclosed having a neck which opens upwards at one end of a flat platform. The jug is provided with a handle slot located below the neck, which tends to reduce rapid variations in pouring rate (i.e. 'glugging') as new oil is poured out. The platform aids in supporting the catch pan as used oil is drained from it through a drain opening, into the emptied jug which had contained the new oil. The catch pan is provided with a plug operated by a T-handle. Also disclosed are a funnel which can be nested in an inverted condition on the jug neck, and a catch pan with a boat-shape to permit over-the-lip pouring of used oil therefrom as an alternative to controlled draining of used oil therefrom through a bottom wall drain.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the Drawings

FIG. 6(a), 6(b) and 6(c) show used oil being poured into the jug of FIGS. 1 and 3–5 from a catch pan having a T-handled plug-type stopper of FIG. 2 for its drain opening.

FIG. 7 shows an alternate form of the kit, in which the pan that the jug is initially nested in has a boat-shaped lip; and FIG. 8 shows used oil being poured over the lip of the pan into the emptied jug using the denested, inverted and connected funnel.

DETAILED DESCRIPTION

Figures 1, 2:
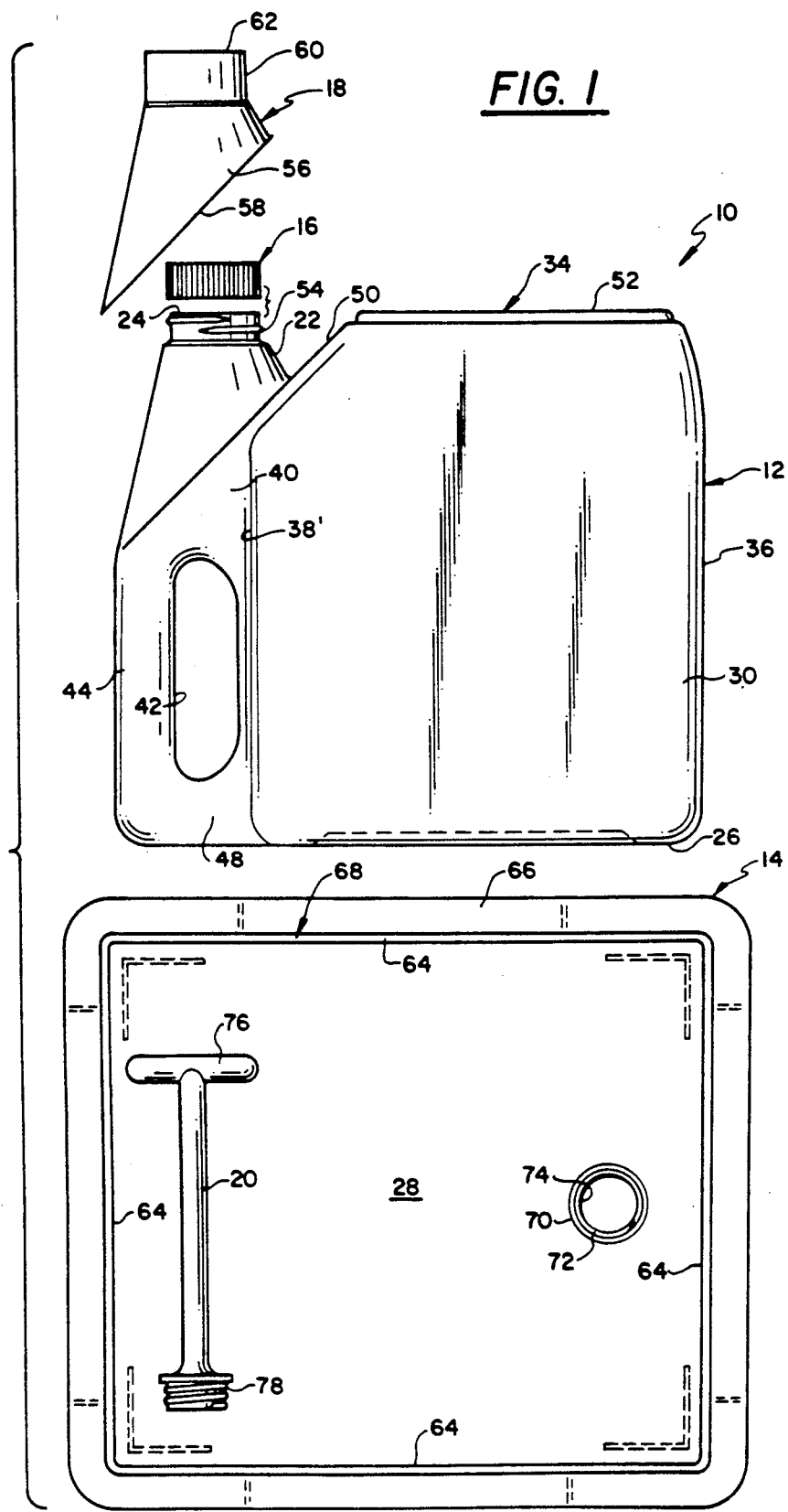
FIG. 1 is an exploded front elevational view of a jug with its cap and funnel, and a used oil catch pan (drain pan) from which the jug has just been denested.
FIG. 2 is an elevational view of the T-handled plug.
Figure 5:
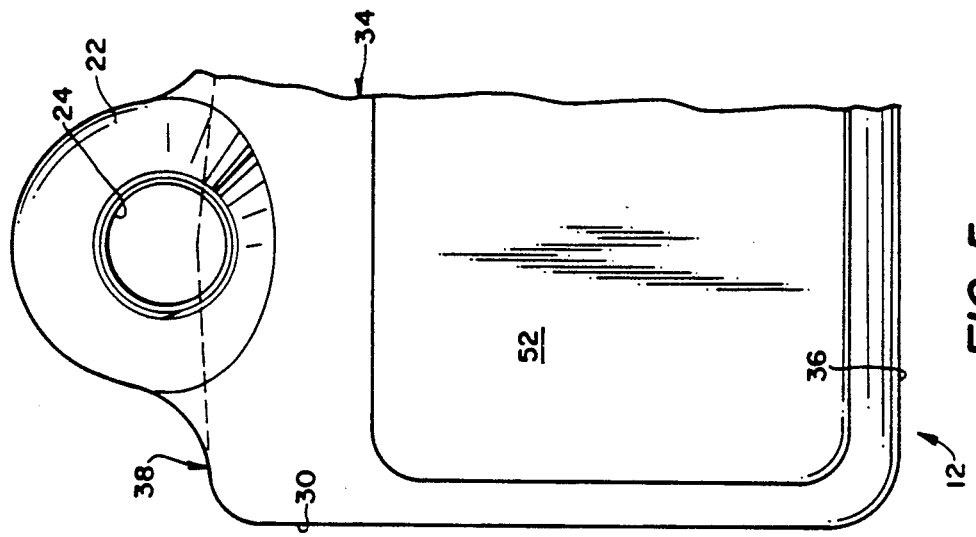
FIG. 5 is a top plan view thereof.
Figure 4:
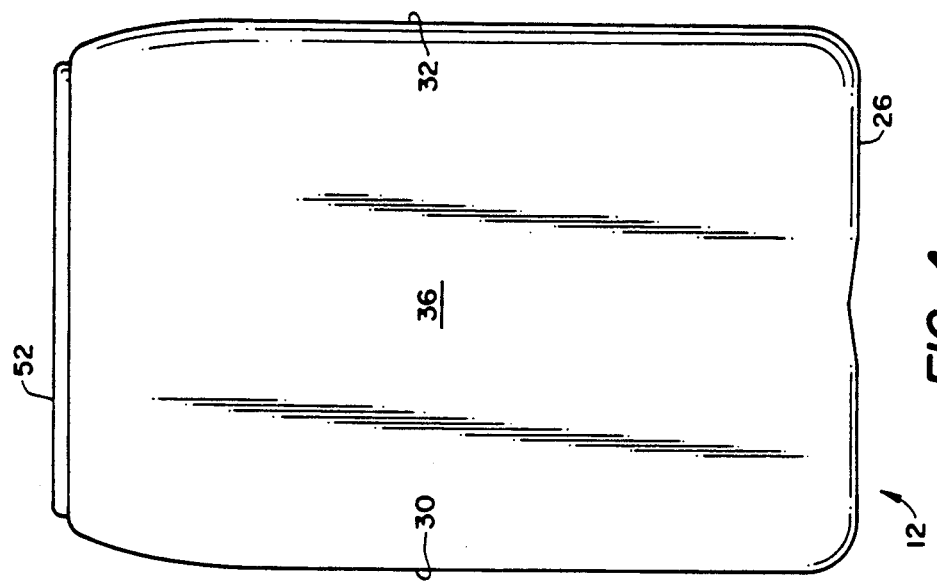
FIG. 4 is a right side elevational view thereof.
Figure 3:
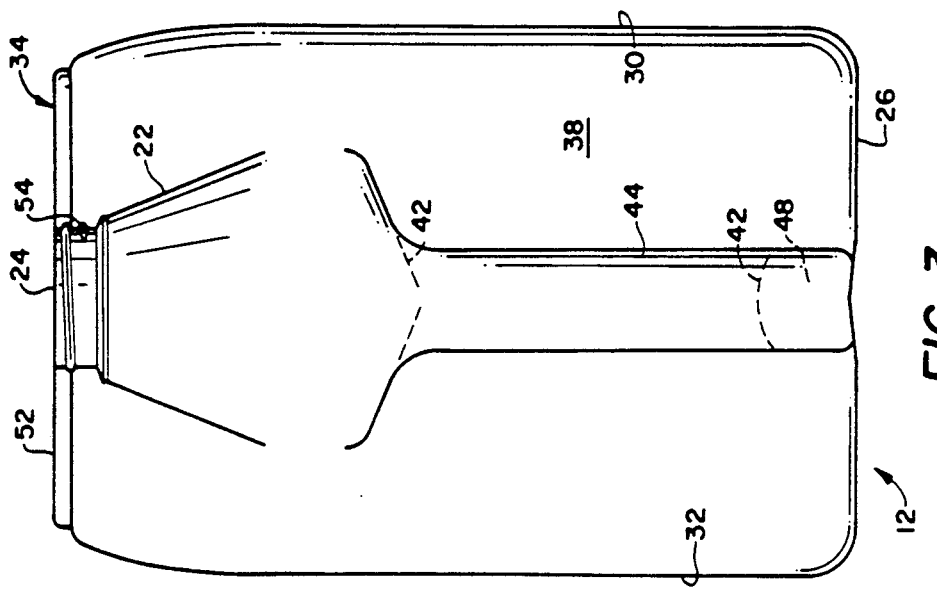
FIG. 3 is a left side elevational view of the jug.

FIG. 1 shows parts of a do-it-yourselfer's oil change kit 10 that includes a new oil jug 12 that denestably nests in a catch pan 14. Other parts depicted are a cap 16, a funnel 18 and a handle-bearing drain plug 20.

The jug 12 is preferably made by a conventional blow-molding process out of high density polyethylene, although any synthetic plastic resin conventionally used in the manufacture of oil jugs can be used. The other parts likewise may be conventionally molded of plastic, e.g. by plug-assisted vacuum thermoforming, injection molding. The catch pan 14 as an alternative to being made of synthetic plastic resin may be made of molded paper pulp or fabricated of paperboard, much as egg cartons and milk cartons conventionally are, and treated with an oil-proofing agent, such as is used for coating paperboard milk cartons.

The internal perimeter of the catch pan 14 preferably is sized and shaped so that the jug 12 nests in it, oriented as shown, with the cap 16 screwed onto the neck 22 of the jug 12 as a closure for its upwardly-directed mouth 24, with the funnel 18 inverted and nested on the neck 22, and the drain plug 20 trapped between the handle of the jug and the bottom wall of the catch pan 14.

(Because the jug and the catch pan have different orientations at different times it is difficult to designate their features in an unambiguous manner. However, for ease of description, the wall of the jug 12 numbered 26 will be called its bottom, and the wall of the catch pan 14 numbered 28 will be called its bottom.)

The jug 12 is seen to have a bottom 26, front and rear walls 30,32, a top wall 34, a right end wall 36 and a left end wall 38. The bottom, front, rear, top and right walls are all generally flat, with rounded corners, but at the left, the jug is abruptly reduced in thickness to provide a shoulder at 38' from which an integral handle portion 40 projects further to the left. A vertically elongated slot 42 is shown formed through the handle portion 40 intermediate the height and width of the handle portion 40. Accordingly, the interior of the handle portion 40 connects with the body of the jug 12 both above and below the handle slot 42, and the handle slot 42 permits the user to get a convenient grip on the handle 44 defined between the slot 42 and the outer end 46 of the handle portion 40. The communication channel in the jug interior at 48 under the handle slot and within the handle preferably is between one and two inches in transverse cross-sectional area, for a new oil jug of 4–5 quart capacity, which are the sizes presently contemplated.

The neck 22 of the jug 12 projects upwards from the handle portion, and from an angled transitional region 50 of the jug body top wall so that its upwardly open mouth 24 is disposed no higher than and preferably a little lower than the large flat platform 52 provided by the top wall 34. The neck 22 is shown having a band of external threading 54 integrally formed thereon adjacent the mouth 24, so that the cap 16 may be screwed in place for openably closing the mouth. (A frangible wafer seal (not shown) e.g. of plastic/metal foil laminate, may be applied to the mouth of the jug for sealing it closed, against leakage or adulteration, when the jug is initially filled with new oil, as has recently become conventional for jugs of new oil.)

The funnel 18 has a generally conically tapered body 56 with an open mouth 58 at its larger end, and a neck 60 which protrudes axially from the smaller end of the body of the funnel. The end 62 of the funnel neck is open, at least when the funnel is made ready for use. However, when the kit is made-up, the funnel 18 is inverted and telescopically nested on the neck of the capped jug of new oil, prior to nesting that jug in the catch pan 14. The funnel 18 may be frictionally held in place, and/or adhesive tape, a dab of adhesive or a shrink-wrap of plastic film or other wrapper about the funnel-bearing jug neck and/or about the whole kit may be provided as a sufficient means for keeping these kit parts assembled until they are to be disassembled for use.

It should be apparent that the flare on the funnel body internal surface matches the taper on the jug neck, and the internal surface of the spout of the funnel matches the external generally cylindrical nature of the capped mouth of the jug.

The catch pan 14 is generally rectangular; in addition to its bottom wall 28, it has four upstanding sidewalls 64, rounded edges and corners, and a lip 66 perimetrically surrounding and defining its open mouth 68. In the floor 28 there is shown provided a drain hole 70 with a neck 72 that projects outwardly a short distance, e.g. about one-fourth to three-fourths of an inch. The external diameter of the drain neck 72 is such as will permit the neck to telescopically fit into or sealingly snuggly telescopically fit around the open neck of the jug 12 at the jug mouth. In the instance depicted, the drain neck is internally threaded as at 74 for threaded receipt of the drain plug 20 to provide a controllably openable closure for the drain hole 70. However, as an alternative, the drain hole 70 could be provided with a non-replaceable frangible closure of the type designed to be pierced or tab-pulled away, as shown in the above-mentioned U.S. patent of P. J. Pollacco.

The preferred closure, as shown, is an externally-threaded drain plug 20, provided with a turnable handle, e.g. a T-handle 76 that is sufficiently long that when the closure is in place in the hole 70 with the handle projecting upwards, the catch pan is slid on its bottom under an automobile crank case and the crank case oil drain outlet is opened allowing used oil to drain from the automobile into the pan 14, by the time the crank case is finished draining of used oil, the handle 76 still projects to a sufficient degree above the level of the used oil as to permit it to be grasped and turned by hand sufficiently to open the drain.

Accordingly, after the used oil has been collected in the catch pan 14, the drain valve on the automotive crank case (not shown) is closed, the funnel 18 is removed from the neck 22 of the jug 12 of new oil and the funnel neck 60 is inserted in the open upper end of the engine oil filler pipe (not shown) of the automobile. The cap 16 is then unscrewed from the neck 22 of the jug 12 and its mouth 24 opened (if it is closed by a conventional frangible wafer seal, not shown), whereupon the new oil may be poured from the jug 12 through the funnel 18, into the sump of the engine. For reasons unknown to the present inventor, as the jug 12 is tilted to pour oil from its neck 22 so that the handle 44 which was at the left become lower, the magnitude of 'glugging' of oil from the jug, i.e. sudden, strong variations in the volume of oil being dispensed per unit time, is substantially reduced in comparison with otherwise similar jugs, having their handles located along the top or along the side opposite from the spout.

When the jug 12 is thus emptied of new oil it is set down on its bottom wall 26, and the funnel is removed from the engine oil filler tube (not shown) and discarded or salvaged for a next use. The catch pan of used oil is slidingly retrieved from under the automobile and placed onto the emptied new oil jug 12 so that the drain neck 72 is slightly telescoped into the neck 22 of the jug 12 and the bulk of catch pan 14 rests via its bottom wall 28 on the platform 52 of the top wall of the jug 12.

Next the handle 76 is moved in a sense to loosen the plug 20 sufficiently as to let the used oil drain from the catch pan 14, through the drain hole 70, and into the jug 12 according to the progression of events depicted in FIGS. 6a, 6b, and 6c. Where the plug 20 is externally threaded, as at 78, the handle can simply be turned in an unscrewing sense. Usually, and especially if the threads 74 and/or the threads 78 are locally discontinuous spirally of the respective surface on which they are provided, complete unscrewing of the plug 20 is unnecessary. (It is thought to be advantageous to screw the plug 20 only part-way out, so that if all is not going well, or the do-it-yourselfer has to turn his or her attention from the project for a little while, e.g. because the phone has rung or a visitor has arrived, there is no need to fumble around trying to re-stopper the drain hole 70. Rather, the handle 76 need simply be turned in a plug screwing-in sense to turn off the flow. Actually, generally there is no need for the do-it-yourselfer to observe this draining procedure, because nothing is likely to go wrong, and there is plenty of room in the jug 12 for the oil draining from the pan 14. However, in informal surveys conducted thus far, consumers have seemed to like this ability to interrupt the flow.)

After the used oil has drained from the pan 14 into the jug 12, the pan 14 is lifted away and the jug reclosed using the cap 16. The pan 14 may be discarded, or salvaged for the next use. The jug 12, now filled with used oil and capped, can be taken conveniently to an oil recycling center.

Rather than purchase an entire kit 10, a do-it-yourselfer could purchase a pan 14, and use it with his or her own separately acquired funnel and jug of new oil. Or, he or she could buy a jug of new oil, with or without the funnel, and use it with a catch pan 14 salvaged and saved from the last time he or she changed their automotive engine oil.

Shown in FIGS. 7 and 8 is a further embodiment which, though it may be less preferred in many instances, yet provides a practical way of putting some important principles of the present invention into use.

There are some oil companies or packagers which have so much money invested in their particular designs of jugs for new oil, that the present inventor has found them to be extremely reluctant to adopt a drain pan/new oil jug kit system such as is explained above with reference to FIGS. 1–6c, since that would entail too large an investment, from their viewpoint, in tooling for a jug 12 with a platform 52 for the pan 14 to rest on while draining used oil into the jug. And they may also be reluctant to go to the expense of tooling for a catch pan 14 with a closed, openable drain 70. The kit embodiment 90 is designed with such economics in mind, as a lower cost way of providing do-it-yourselfers with a socially responsible way of changing their engine oil.

The kit 90 is shown including an existing, popular shape jug of new oil 92 having a generally flat bottom wall 94, a peripheral sidewall 96, a generally conical top wall 98 offset towards one side where it terminates upwardly in neck 100 having an externally threaded band 102 for removably receiving a closure cap (not shown, but like the cap 16). This neck 100 happens to have an axially short externally smooth, cylindrical band 104 extending above its threading 102.

The slotted handle 106 is provided crosswise through the top wall of the jug 92, as shown.

The catch pan 108 has a bottom wall 110, and upstanding peripheral sidewalls 112 which give the catch pan generally a boat shape as seen in plan, i.e. with a 'stern' at 114 and a 'bow' at 116. (Of course in this instance the apex of the bow is located off to one side; in fact it is coincident with the left sidewall in the instance depicted, but that is because the neck of the jug is similarly displaced towards one side of the jug. For jugs with a centrally located neck, the catch pan would have its apex along its centerline as well.) A funnel 118 is telescopically nested on the jug neck in an inverted condition and held there in any convenient way (such as is described above in relation to the funnel 18). The closed jug of new oil 92, with its funnel 118 invertedly nested on its neck is nested in the open top of the pan 108. These parts may be kept assembled, as shown, until needed simply by gravity, or by a shrink-wrap sleeve of plastic film (not shown) or an enclosing container of paperboard (not shown) or in any other convenient manner.

At the time of use, the kit 90 is disassembled into its parts: the jug of new oil, the funnel 118 and the catch pan 108. The catch pan 108 is slid under the automobile and used oil is drained into it from the engine crank case. The crank case drain outlet is closed and the jug 92 of new oil is uncapped. The funnel 118 may be used as the new oil is poured from the jug 92 into the sump of the engine through the engine oil filler tube of the engine (not shown).

As with the first embodiment, the open, emptied jug 92 is then set down on its flat bottom 94. But now the method of use diverges from that of the first embodiment. The funnel 118 is retrieved and the open lower end portion of its spout 120 is telescopically joined with the non-threaded band 104 on the jug neck. (The fit is so snug no oil can leak, even though the spout telescopically surrounds the band 104.) Next, the pan of used oil is slid out from under the automobile, and the used oil is poured over the apex 122 of the lip 124 of the pan, through the open mouth of the funnel 118, into the emptied jug 92. When the pan 108 is thus emptied and the jug 92 is thus filled with used oil, the pan 108 is discarded or salvaged, as is the funnel 118, the jug 92 is recapped with its original cap and the thus-closed container of used oil may be conveniently taken to an oil recycling center.

As with the first embodiment, the parts 92, 108 and 118 could be sold separately, for use together.

It should now be apparent that the do-it-yourself automotive oil change devices as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A jug, having:
   a bottom wall, a set of upstanding sidewalls and a top wall, providing a jug body, and a neck which projects outwardly from the body, this neck terminating in a mouth through which contents may be poured from the jug, and a closure adapted to removably close that mouth, said neck having an upwardly-tapering generally conical lower portion adjoining a generally cylindrical upper portion; and
   said jug neck is offset to one side of said jug body over a handle portion that is internally communicated with but thinner than said jug body; there being means defining a generally vertically elongated handle slot provided through the thickness of said handle portion of said jug under said jug neck.

2. The jug of claim 1, wherein:
   said jug includes an upwardly facing, generally horizontal platform on said top wall thereof for removably supporting a catch pan as such catch pan is being drained into said jug through said neck.

* * * * *